March 9, 1965 R. W. EMANUS 3,172,383
SOLDER FEEDING IRON
Filed April 1, 1963
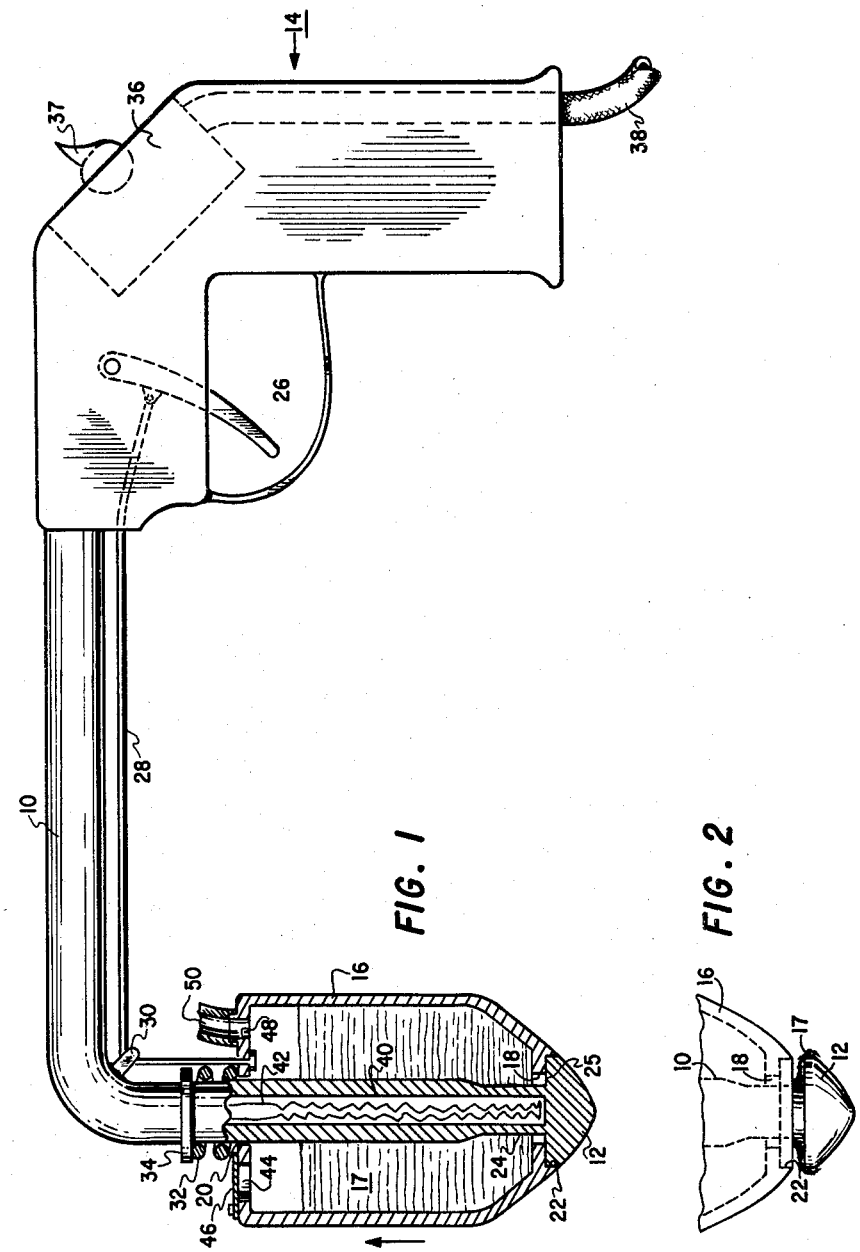
INVENTOR
RUPERT W. EMANUS
BY *Griffin and Stokes*
ATTORNEYS

United States Patent Office 3,172,383
Patented Mar. 9, 1965

3,172,383
SOLDER FEEDING IRON
Rupert W. Emanus, Oakdale, La.
(2826 Louis St., Alexandria, La.)
Filed Apr. 1, 1963, Ser. No. 269,452
4 Claims. (Cl. 113—93)

This invention relates to a soldering iron which incorporates a well for holding liquid solder and having improved valve mechanism for applying said solder to a workpiece.

Soldering irons for conveniently feeding liquid solder to the tip are per se old in the art. Most of the existing structures provide a well or chamber for holding the liquid solder together with valve mechanism for selectively applying the solder to the external workpiece. In all prior art the valve member itself is situated inside the well for selectively obstructing a passageway through the well wall to the external well surface. In the present invention, on the other hand, valve mechanism is provided whereby the valve member is external of the well. This disposition aids in the rapid initiation or extinguishing of solder flow. Preferably, the valve member is also shaped so that it can be used as an applicator or spreader of the emerging solder to the workpiece. A heating element is preferably incorporated into the structure to initially melt and keep liquid the solder in the well, and to heat the valve.

It is therefore an object of the present invention to provide a soldering iron wherein liquid solder from a well is applied via a valve member external to said well.

A further object of the present invention is to provide a soldering iron which includes a barrel having a valve member at one end thereof for selective cooperation with a solder well slidable on said barrel.

One more object of the present invention is to provide a soldering iron having a solder well cooperating with a heated external valve member.

These and other objects of the invention will become apparent during the course of the following description to be read in conjunction with the drawings, in which:

FIGURE 1 is a side elevation partially in section of one preferred embodiment of the present invention; and FIGURE 2 is a partial side elevation illustrating the operation of the device.

FIGURE 1 shows a preferred embodiment of the invention which in general comprises a barrel 10 having a valve member 12 attached to its working end and a handle structure 14 attached to its opposite end. Slidably mounted on barrel 10 is a well 16 for holding liquid solder. Well 16 has a solder outlet passage 18 at its lower end through which extends barrel 10 such that valve 12 is external to the well. An aperture 20 is located at the upper end of the well through which the barrel also extends. A valve seat 22 surrounds passage 18 on the external surface of well 16, said valve seat preferably, but not necessarily, being slightly countersunk. The cross-sectional area of passage 18 is larger than the cross-sectional area of that portion 24 of the barrel which passes through said passage. Consequently, when valve member 12 and well 16 are apart one from the other, liquid solder in the well escapes through passage 18 to the external environment.

One important advantage derived from the positioning of valve 12 external to well 16 is that its relative motion, when opening passage 18, is in the same direction that the solder must take in flowing from the well to the external environment. Thus, solder flow is quickly commenced. Furthermore, this external valve positioning aids in rapidly extinguishing solder flow at the conclusion of the soldering step when the valve 12 returns to valve seat 22. For this operation, the relative direction of valve motion with respect to well 16 is now such as to forcefully oppose the flow of solder through passage 18. These described advantages are not obtained in prior art devices having an internal valve member which, when being moved to open the solder passage, actually tends to carry solder away from the passage opening in the well wall; and when being moved to close said passage, actually applies force for a short period of time to thereby eject solder at a faster rate before the passage is completely closed.

Another important feature can be easily provided by the external valve structure above described. It will be noted that FIGURE 1 shows valve stem portion 24 to be smaller in diameter than that part of barrel 10 remaining in well 16. Since the effective well volume used in holding solder is actually equal to its maximum internal volume less the total volume of barrel 10 (in well 16 only), it can be seen that said effective volume is less for an open valve position than for a closed valve position. This is because all or some of valve stem portion 24 has, in the former case, been relatively moved out of the well 16 interior which thus effectively increases the volume of the remaining part of barrel 10. The pressure consequently produced on the liquid solder held in the well helps to rapidly force said solder through passage 18 to the external environment upon the initial opening of said passage. By further locating the tapered portion of barrel 10 close to passage 18 (in other words, limiting the length of valve stem 24 to no more than is required by the desired maximum open position of valve 12), the reduction in well volume effectively occurs only near the bottom of the well so that the increased pressure is initially applied to the solder immediately above passage 18. Normally, the quick ejection of this solder through passage 18 will release this pressure and so prevent any substantial rise in the level of the solder at the opposite end of the well. In place of this preferred disclosed structure, however, it is of course possible to provide other configurations of the barrel 10 and/or attachments thereto for likewise causing an initial internal pressure to be exerted on the solder at the time when valve stem 24 is first moved with respect to well 16 in order to open passage 18.

Although relative separation between valve member 12 and well 16 may be effected in several different ways, it is preferred that valve 12 and handle 14 be fixed with respect to each other, with well 16 movable with respect to each. In FIGURE 1, this is accomplished by moving well 16 along barrel 10 away from valve member 12 to thereby permit solder to egress from passage 18. A simple expedient is to provide a trigger 26 at handle 14 which is connected by a flexible cable 28 to well 16. Cable 28 may be guided through an eyelet 3 attached to barrel 10 and having a guide roller if desired. When trigger 26 is pulled by the finger of an operator, well 16 slides upward along the barrel so as to move away from valve 12 in the manner thus shown in FIGURE 2. By providing a coil spring 32 in compression, which is preferably fitted between the top of well 16 and a flange 34 of the barrel in order to simplify fabrication, well 16 is normally biased to contact valve 12 during the time that trigger 26 is not pulled by an operator. A biasing spring could alternatively be placed around valve stem 24 inside of the well. This relationship between valve 12, handle 14, and well 16 is quite advantageous when soldering fragile components on which little or no soldering iron pressure can be tolerated. For example, the operator can initially manipulate the iron by its handle to allow valve 12 to touch or come quite close to the workpiece without applying any pressure to said workpiece, since the hand of the operator around handle 14 applies all of the balanced forces necessary to maintain the iron in a position of static equilibrium, i.e., not moving. When the operator's forefinger squeezes trigger 26, the additional external force required to balance the forefinger force (and so maintain the iron in equilibrium) is automatically supplied by the hand to which said forefinger is attached. The hand itself, however, need not move. Therefore, there is no chance for the iron, and consequently the valve, to press firmly and injuriously against the workpiece during the act of squeezing. If the construction is such that the well and handle are stationary with respect to one another while valve member 12 moves outwardly from said well, then additional force may be accidentally applied to the workpiece during the act of moving said valve unless the operator takes great care to simultaneously move at the same speed his hand, and thus the handle and well, in the opposite direction away from the workpiece. Thus, while the basic principle of this invention is meant to include modified constructions such as the one just described, the preferred embodiment of FIGURE 1 provides increased operator control over the exact positioning of the soldering iron tip.

Another important feature of this invention is the shaping and heating of valve 12 to act as the working tip of the iron, whereby it can be used as an applicator or spreader of the solder on the workpiece. Handle structure 14 contains an electrical switch unit 36 which receives external power via a cable 38. A switch handle 37 may be flipped by the thumb of the operator to actuate the switch. The working end of barrel 10 is hollow, as shown by 40 in FIGURE 1, and is constructed of some heat transmitting material. Inserted within this hollow portion of the barrel is an electrical resistance wire 42, or some other electrical heating element, which preferably extends most of the well length down to at least valve 12. Current is supplied to resistance 42 from switch 36 such that the heat generated thereby is transmitted through barrel 10 to initially melt and then maintain in liquid state the solder in well 16. If desired, a thermostat and transformer may also be included in the handle to perform well known functions. Valve 12 is also fabricated of a heat transmitting material in order to preheat an area to be soldered and melt old solder away, using for this purpose the heat from resistance 42. Another advantage of the heated valve member tip is that the solder will flow more evenly past it on the way to the workpiece.

An opening 44 may be provided at the top of well 16 for entry of solder pellets into the well during the charging thereof. The solder pellets are then melted by the heat generated by resistance 42. A swingable cap or cover 46 is used to close off opening 44. A vent 48 is also provided for communication by the well interior with the external atmospheric pressure. This pressure may be helpful or necessary to aid flow of the liquid solder onto valve 12 through passage 18. Furthermore, it provides an emergency escape path for solder overflow which may be due either to decreased volume in the well or to high temperature. An external tube or lip 50 is preferably attached to vent 48 in order to prevent outflow of solder from well 16 if the iron is held or laid in certain non-working positions.

While a preferred embodiment of the invention has been shown and described, it is obvious that modifications may be made thereto by persons skilled in the art without departing from the novel principles recited in the appended claims.

I claim:
1. A soldering iron which comprises:
   (a) a barrel having a valve member at one end thereof and a handle at the other end thereof;
   (b) a well for holding liquid solder having a solder outlet passage and an aperture at opposite ends thereof, which is slidably mounted on said barrel such that said barrel one end and other end extend through said well solder outlet passage and aperture, respectively, with said barrel one end having a substantially smaller cross-sectional area than said passage cross-sectional area through which it extends and with that portion of the barrel within said well having a larger cross-sectional area than said barrel one end such that the well effective solder holding volume is reduced as said well moves away from said valve member, where the length of said smaller barrel one end is substantially longer than the total thickness of the well wall at said solder outlet passage as measured along the barrel axis;
   (c) means connected to said well for operator use in sliding said well along said barrel to various positions;
   (d) a valve seat surrounding said solder outlet passage on the external surface of said well for cooperating with said valve member to thereby variably obstruct said outlet passage for various positions of said well along said barrel; and
   (e) an electrical heating element inside of said barrel at least near its said one end for applying heat to both said valve member and to the solder in said well.
2. A soldering iron according to claim 1 wherein said means includes means for normally biasing said well in a position along said barrel abutting said valve member such that said valve member completely closses said solder outlet passage to solder flow.
3. A soldering iron according to claim 2 wherein said biasing means comprises a spring, one end of which is connected to said well and the other end of which is connected to said barrel.
4. A soldering iron according to claim 3 wherein said spring is coiled around a portion of said barrel and external to said well.

References Cited in the file of this patent
UNITED STATES PATENTS

| | | |
|---|---|---|
| 559,337 | Lang | Apr. 28, 1896 |
| 787,342 | Moore | Apr. 11, 1905 |
| 877,509 | Langstaff | Jan. 28, 1908 |
| 2,612,128 | Warsaw | Sept. 30, 1952 |
| 2,684,105 | Graves | July 20, 1954 |

FOREIGN PATENTS

| | | |
|---|---|---|
| 422,354 | Italy | June 16, 1947 |